(12) United States Patent
Ozeki et al.

(10) Patent No.: US 11,255,249 B2
(45) Date of Patent: Feb. 22, 2022

(54) VALVE DEVICE

(71) Applicant: YAMADA MANUFACTURING CO., LTD., Kiryu (JP)

(72) Inventors: Akifumi Ozeki, Kiryu (JP); Toshihito Nagai, Kiryu (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 0 days.

(21) Appl. No.: 16/643,734

(22) PCT Filed: Sep. 25, 2018

(86) PCT No.: PCT/JP2018/035377
§ 371 (c)(1),
(2) Date: Mar. 2, 2020

(87) PCT Pub. No.: WO2019/065601
PCT Pub. Date: Apr. 4, 2019

(65) Prior Publication Data
US 2020/0400062 A1 Dec. 24, 2020

(30) Foreign Application Priority Data
Sep. 26, 2017 (JP) .............................. JP2017-184802

(51) Int. Cl.
*F01P 7/16* (2006.01)
*F16K 5/04* (2006.01)
*F01P 7/14* (2006.01)

(52) U.S. Cl.
CPC .............. *F01P 7/165* (2013.01); *F16K 5/045* (2013.01); *F01P 2007/146* (2013.01);
(Continued)

(58) Field of Classification Search
CPC ...... F01P 7/165; F01P 2007/146; F16K 5/045
See application file for complete search history.

(56) References Cited

U.S. PATENT DOCUMENTS 3,657,783 A 4/1972 Ellis
2006/0189786 A1* 8/2006 Mitchell ................ C08G 75/02
528/373

FOREIGN PATENT DOCUMENTS

CN 1287218 A 3/2001
CN 1771384 A 5/2006
(Continued)

OTHER PUBLICATIONS

International Search Report, dated Dec. 25, 2018 (dated Dec. 25, 2018), 1 page.
(Continued)

*Primary Examiner* — Kevin A Lathers
(74) *Attorney, Agent, or Firm* — Rankin, Hill & Clark LLP

(57) ABSTRACT

A valve device includes: a casing having an outflow port in which a fluid outlet opening is formed; a joint joined to an opening end surface of the outlet opening; a valve accommodated in the casing so as to be rotatable or slidable and in which a communication port that can communicate with the outlet opening is formed; and a sliding ring with a sliding surface for sliding on an outer surface of the valve while being accommodated in the outflow port and communicates the outlet and the communication port based upon a position of the valve. At least the outer surface of the valve includes a first resin material that contains a first resin, at least the sliding surface of the sliding ring includes a second resin material that contains a second resin, and the first resin and the second resin are the same type of resin.

10 Claims, 7 Drawing Sheets

(52) U.S. Cl.
CPC ....... *F01P 2060/04* (2013.01); *F01P 2060/08* (2013.01); *F01P 2060/16* (2013.01)

(56) References Cited

FOREIGN PATENT DOCUMENTS

| | | |
|---|---|---|
| CN | 101440873 | 5/2009 |
| CN | 102414416 A | 4/2012 |
| CN | 102758932 | 10/2012 |
| CN | 103261590 | 8/2013 |
| CN | 103726900 A | 4/2014 |
| CN | 106121867 A | 11/2016 |
| DE | 4416039 C1 | 8/1995 |
| ES | 303326 | 11/1964 |
| JP | 2005-524804 | 8/2005 |
| JP | 2013-224701 | 10/2013 |
| JP | 2013224701 A * | 10/2013 |
| JP | 2015-200391 | 11/2015 |
| JP | 2016-196931 | 11/2016 |
| JP | 2016-196957 | 11/2016 |
| JP | 2016196931 A * | 11/2016 |
| WO | 03/093704 | 11/2003 |

OTHER PUBLICATIONS

Chinese Office Action with partial English translation dated May 8, 2021, 11 pages.
Chinese Office Action dated Nov. 2, 2021, English abstract included, 8 pages.

* cited by examiner

VALVE DEVICE

TECHNICAL FIELD

The present invention relates to a valve device.

Priority is claimed on Japanese Patent Application No. 2017-184802, filed Sep. 26, 2017, the content of which is incorporated herein by reference.

BACKGROUND ART

Conventionally, a cooling system for cooling an engine using cooling water is known. In this type of cooling system, there are cases in which a plurality of heat exchange flow paths for circulating cooling water between various heat exchangers are provided separately from a radiator flow path for circulation between a radiator and an engine.

In such a cooling system, a valve device for controlling circulation of the cooling water to each passage is provided at a branched portion leading to each passage (a radiator flow path, a heat exchange flow path, and the like).

The valve device described above includes a casing having an outflow port in which an outlet for cooling water is formed, and a valve that is rotatably accommodated inside the casing and has a flow passage through which the cooling water flows. A communication port that allows the flow passage and the above-described outlets to communicate with each other in accordance with rotation of the valve is formed in the valve.

According to this configuration, the communication and shut-off between the outlet and the communication port can be switched by rotating the valve. Then, the cooling water which has flowed into the valve device flows out from the valve device through the outlet in a state of communicating with the communication port in the course of flowing through the flow passage. As a result, the cooling water which has flowed into the valve device is distributed to one or a plurality of flow paths in accordance with rotation of the valve.

In the valve device described above, a joint for connecting the outflow port (outlet) and each flow path is joined to the outflow port. A sealing mechanism for sealing between the joint and the valve is provided in the outflow port. For example, Patent Document 1 below discloses a configuration including, as a sealing mechanism, an annular seat having an opening that can communicate with an outflow port, and a concave spherical sealing surface that is pressed against the outer peripheral surface of a ball valve by the elastic force of an elastic member.

The required characteristics differ between the valve and a sliding member that is in sliding contact with the outer peripheral surface of the valve, such as the annular seat described above. For this reason, the sliding member and the valve are usually constituted of different materials. For example, the above-described Patent Document 1 describes PPS as a material for a ball valve and PTFE as a material for a valve seat.

Citation List

[Patent Document]
[Patent Document 1] Japanese Unexamined Patent Application, First Publication No. 2016-196957

SUMMARY OF INVENTION

Technical Problem

In the above-described prior art, when the temperature of the fluid to be circulated changes, the valve and the seat expand or contract, respectively, and the dimensions change. At this time, since the respective dimensional change rates of the valve and the seat are different, a gap is generated between the valve and the seat, and the sealing performance is likely to deteriorate. If the seal between the joint and the valve becomes insufficient due to a decrease in sealing performance, the desired function for controlling the flow rate may be impaired. Further, when an elastic member is used for a sealing portion, although a dimensional change due to a temperature change can be absorbed, since the friction caused by the operation is large, the drive unit tends to become massive.

Accordingly, the present invention has been made in consideration of the above-described circumstances, and has an object of providing a valve device in which a decrease in sealing performance due to a temperature change is suppressed.

Solution to Problem

In order to solve the above problems, the present invention employs the following aspects.

A valve device according to an aspect of the present invention comprises: a casing having an outflow port in which a fluid outlet opening in a first direction is formed; a joint joined to an opening end surface of the outlet in the outflow port; a valve accommodated in the casing so as to be rotatable or slidable and in which a communication port that can communicate with the outlet is formed; and a sliding ring that has a sliding surface for sliding on an outer surface of the valve while being accommodated in the outflow port and communicates the outlet and the communication port in accordance with a rotating position or a sliding position of the valve, wherein at least the outer surface of the valve comprises a first resin material that contains a first resin as a main component, at least the sliding surface of the sliding ring comprises a second resin material that contains a second resin as a main component, and the first resin and the second resin are the same type of resin.

According to the present aspect, it is configured so that the outer surface of the valve and the sliding surface of the sliding ring are composed of a resin material containing the same type of resin as a main component. For this reason, a decrease in sealing performance due to the temperature change is suppressed. That is, since each resin material contains the same type of resin as a main component, there is little difference in thermal characteristics such as a linear expansion coefficient. Therefore, when the temperature changes, the difference in dimensional change due to expansion or contraction of each resin material is small. For this reason, even if the dimensions change, the gap generated between the outer surface of the valve and the sliding surface of the sliding ring can be reduced, and the amount of fluid leaking from the gap can be reduced.

Further, since the above configuration is adopted, the sliding surface of the sliding ring tends to have a high wear coefficient and wear easily as compared to cases where the outer surface of the valve is composed of PPS and the sliding surface of the sliding ring is composed of PTFE as in the above-described prior art. Therefore, even if there is a dimensional error on the outer surface of the valve or the sliding surface of the sliding ring immediately after production, the dimensional error is reduced due to wear of the sliding surface, and the sealing performance improves.

It is preferable that the valve device of the above aspect further comprises a sealing ring interposed between an inner peripheral surface of the outflow port and an outer surface of the sliding ring. Further, it is preferable that: the sliding ring comprises a small diameter portion having the outer peripheral surface on which the sealing ring slides, and a large diameter portion which is positioned on a side of the valve in the first direction with respect to the small diameter portion and is increased in diameter with respect to the small diameter portion; a surface of the large diameter portion facing the valve in the first direction constitutes the sliding surface; a surface of the large diameter portion facing an opposite side of the valve in the first direction constitutes a facing surface that faces the sealing ring in the first direction; and an area of the sliding surface is larger than an area of the facing surface.

According to the present aspect, a liquid pressure inside the casing acts on the facing surface and the sliding surface of the sliding ring. At this time, the pressure of a fluid inside the casing directly acts on the facing surface. On the other hand, the pressure of the fluid inside the casing does not directly act on the sliding surface. More specifically, the pressure of the fluid acts while the pressure is reduced when the fluid flows from an outer peripheral edge toward an inner peripheral edge through a minute gap between the sliding surface and the valve. At this time, the pressure of the fluid gradually decreases toward the inner peripheral edge and tends to push the sliding ring outward in the first direction. For this reason, if a pressing force in the first direction due to the liquid pressure acting on a sealing tubular member through the facing surface is a force equal to or greater than a rising force from the valve acting on the sliding ring when the fluid leaks out from the minute gap between the sliding surface and the valve, the sliding surface of the sliding ring can be maintained in contact with the valve.

Here, in the present aspect, since the area of the sliding surface of the sliding ring is greater than the area of the facing surface, even if the liquid pressure inside the casing increases, the sliding ring can be prevented from being pressed against the valve with an excessive force. Therefore, a drive unit which drives the valve can be prevented from increasing in size and having a high output, and early wear of the sliding ring and the like can also be suppressed.

In the valve device of the above aspect, it is preferable that a sliding speed of the sliding surface with respect to the outer surface when the valve rotates or slides is 3 m/min or less.

In a sliding element made of a resin, when the same material is used for the fixing side and the operating side, there is a concern of melting, anchoring and excessive wear of the material due to the sliding heat. For this reason, it is common to combine different types of materials for each, or to use a metal for one. However, at the response speed required for a control valve such as an electric water valve (EWV), it is preferable to reduce the sliding speed of the sealing surface (3 m/min or less), and due to suppression of the above excessive pressing force and the liquid film existing in the minute gaps on the sliding surface, wear of the sealing surface can be suppressed even when the main component of the resin material is the same. Therefore, it is possible to operate with a compact drive unit with low friction while maintaining the sealing performance and long life.

In the valve device of the above aspect, it is preferable that a surface pressure acting between the outer surface and the sliding surface when the valve rotates or slides is 1 MPa or less.

According to the present aspect, melting and excessive wear of the sliding ring can be suppressed more effectively.

In the valve device of the above aspect, it is preferable that a linear expansion coefficient of the second resin material is from 40 to 250% with respect to a linear expansion coefficient of the first resin material.

According to the present aspect, a gap generated between the outer surface of the valve and the sliding surface of the sliding ring due to a dimensional change caused by a temperature change can be made smaller.

In the valve device of the above aspect, the first resin and the second resin are preferably both polyphenylene sulfide, polyether ether ketone or polyamide, and particularly preferably polyphenylene sulfide (PPS).

According to the present aspect, the creep resistance of each of the outer surface of the valve and the sliding surface of the sliding ring is further improved, the deterioration of the sealing performance due to creep can be suppressed, and the sealing performance can be maintained over a long period of time. In particular, PPS can be injection molded, and the production cost can be reduced.

Advantageous Effects of Invention

According to one aspect of the present invention, it is possible to provide a valve device that enables appropriate cooling control with a compact drive unit in which a decrease in sealing performance due to a temperature change is suppressed.

DESCRIPTION OF EMBODIMENTS

Next, an embodiment of the present invention will be described based on the drawings. In the following description, a case in which a valve device of the present embodiment is employed in a cooling system for cooling an engine using cooling water will be described.

[Cooling System]

Figure 1:
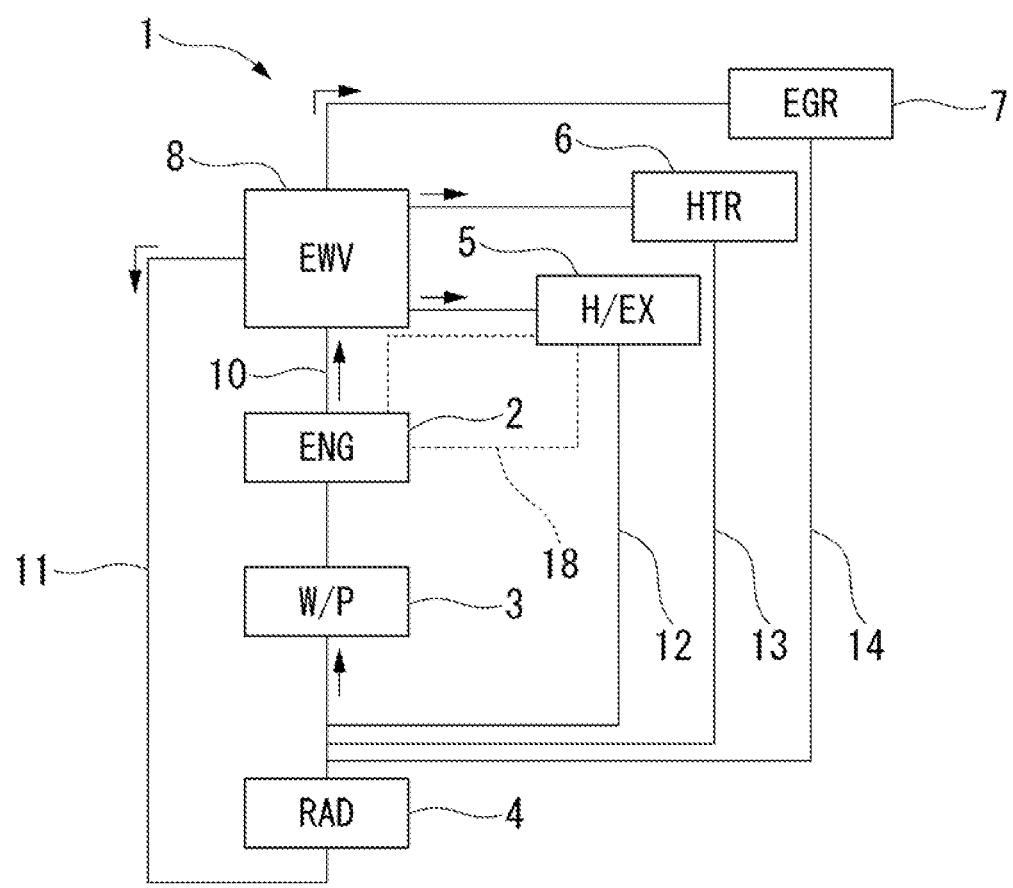
FIG. 1 is a block diagram of a cooling system according to an embodiment.

FIG. 1 is a block diagram of a cooling system 1.

As shown in FIG. 1, the cooling system 1 is mounted on a vehicle having at least an engine as a vehicle driving source. It should be noted that the vehicle may be a hybrid vehicle, a plug-in hybrid vehicle or the like, in addition to a vehicle having only an engine.

The cooling system 1 has a configuration in which an engine 2 (ENG), a water pump 3 (W/P), a radiator 4 (RAD), a heat exchanger 5 (H/EX), a heater core 6 (HTR), an EGR cooler 7 (EGR) and a valve device 8 (EWV) are connected to each other through various flow paths 10 to 14.

The water pump 3, the engine 2, and the valve device 8 are connected in order on the main flow path 10 from the upstream side to the downstream side. In the main flow path 10, the cooling water passes in order through the engine 2 and the valve device 8 by the operation of the water pump 3.

Each of a radiator flow path 11, a warming flow path 12, an air conditioning flow path 13 and an EGR flow path 14 is connected to the main flow path 10. The radiator flow path 11, the warming flow path 12, the air conditioning flow path 13, and the EGR flow path 14 connect the upstream portion of the water pump 3 in the main flow path 10 and the valve device 8.

The radiator 4 is connected to the radiator flow path 11. In the radiator flow path 11, heat exchange between the cooling water and the outside air is performed in the radiator 4.

The heat exchanger 5 is connected to the warming flow path 12. Engine oil circulates between the heat exchanger 5 and the engine 2 through an oil flow path 18. In the warming flow path 12, heat exchange between the cooling water and the engine oil is performed in the heat exchanger 5. That is, the heat exchanger 5 functions as an oil warmer when the water temperature is higher than the oil temperature, and heats the engine oil. On the other hand, the heat exchanger 5 functions as an oil cooler when the water temperature is lower than the oil temperature, and cools the engine oil.

The heater core 6 is connected to the air conditioning flow path 13. The heater core 6 is provided, for example, in a duct (not shown) of an air conditioner. In the air conditioning flow path 13, heat exchange between the cooling water and the air-conditioned air circulating inside the duct is performed in the heater core 6.

The EGR cooler 7 is connected to the EGR flow path 14. In the EGR flow path 14, heat exchange between the cooling water and an EGR gas is performed in the EGR cooler 7.

In the cooling system 1 described above, the cooling water that has passed through the engine 2 in the main flow path 10 flows into the valve device 8 and is then selectively distributed to the various flow paths 11 to 13 by the operation of the valve device 8. As a result, early temperature rise, high water temperature (optimum temperature) control, and the like can be realized, and improvement in fuel efficiency of the vehicle is achieved.

<Valve Device>

Figure 2:
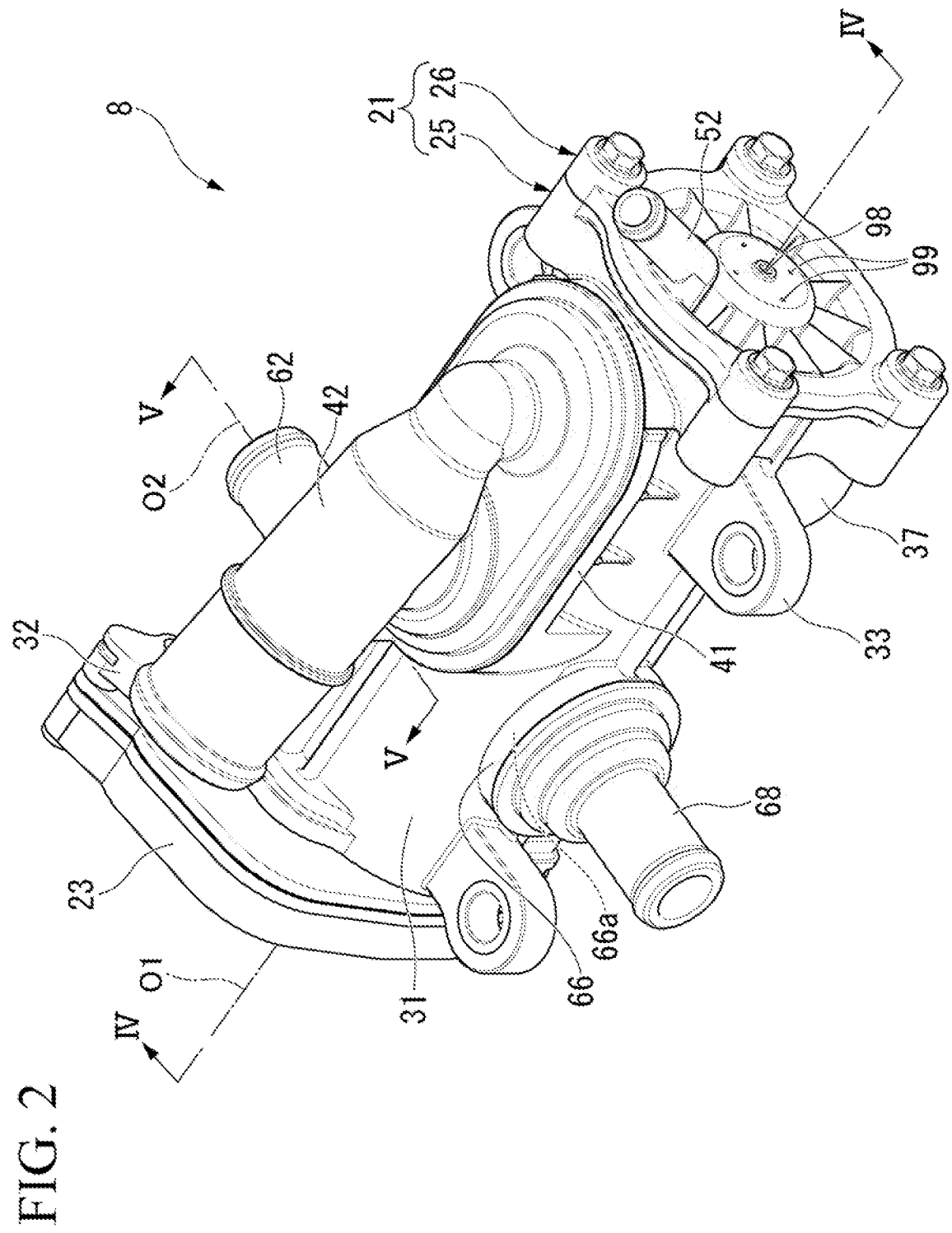
FIG. 2 is a perspective view of a valve device according to an embodiment.
Figure 3:
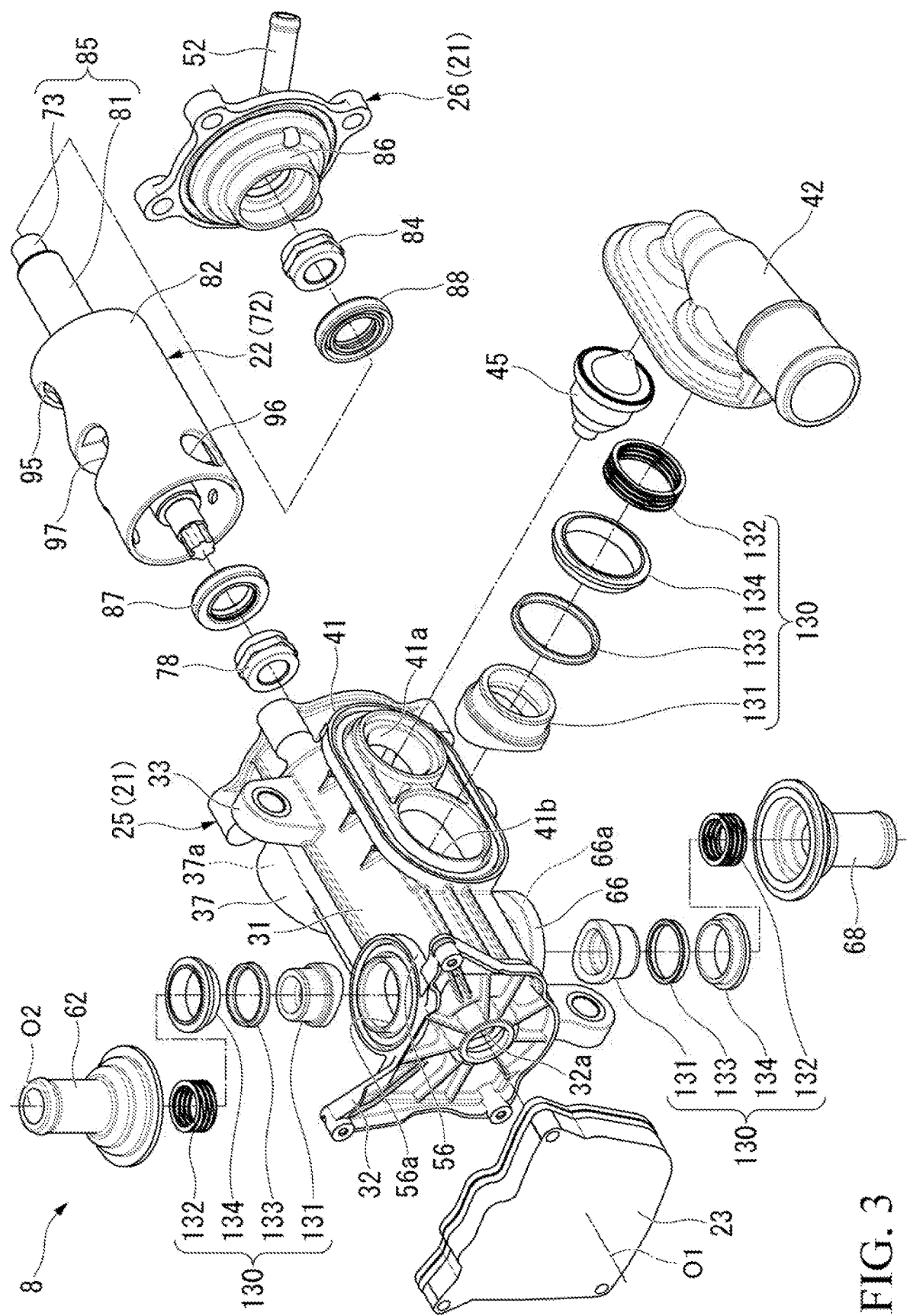
FIG. 3 is an exploded perspective view of the valve device according to the embodiment.

FIG. 2 is a perspective view of the valve device 8. FIG. 3 is an exploded perspective view of the valve device 8.

As illustrated in FIGS. 2 and 3, the valve device 8 mainly includes a casing 21, a rotor (valve) 22 (see FIG. 3), and a drive unit 23.

(Casing)

The casing 21 has a bottomed tubular casing main body 25 and a lid body 26 that closes an opening portion of the casing main body 25. It should be noted that in the following description, a direction along an axis O1 of the casing 21 is simply referred to as a case axial direction. In the case axial direction, a direction toward a bottom wall portion 32 of the casing main body 25 with respect to a peripheral wall portion 31 of the casing main body 25 is referred to as a first side, and a direction toward the lid body 26 with respect to the peripheral wall portion 31 of the casing main body 25 is referred to as a second side. Furthermore, a direction orthogonal to the axis O1 is referred to as a case radial direction, and a direction around the axis O1 is referred to as a case circumferential direction.

A plurality of attachment pieces 33 are formed in the peripheral wall portion 31 of the casing main body 25. Each of the attachment pieces 33 is provided to protrude outward from the peripheral wall portion 31 in the case radial direction. For example, the valve device 8 is fixed inside an engine room via each of the attachment pieces 33. It should be noted that the positions, the number, and the like of the attachment pieces 33 can be suitably changed.

Figure 4:
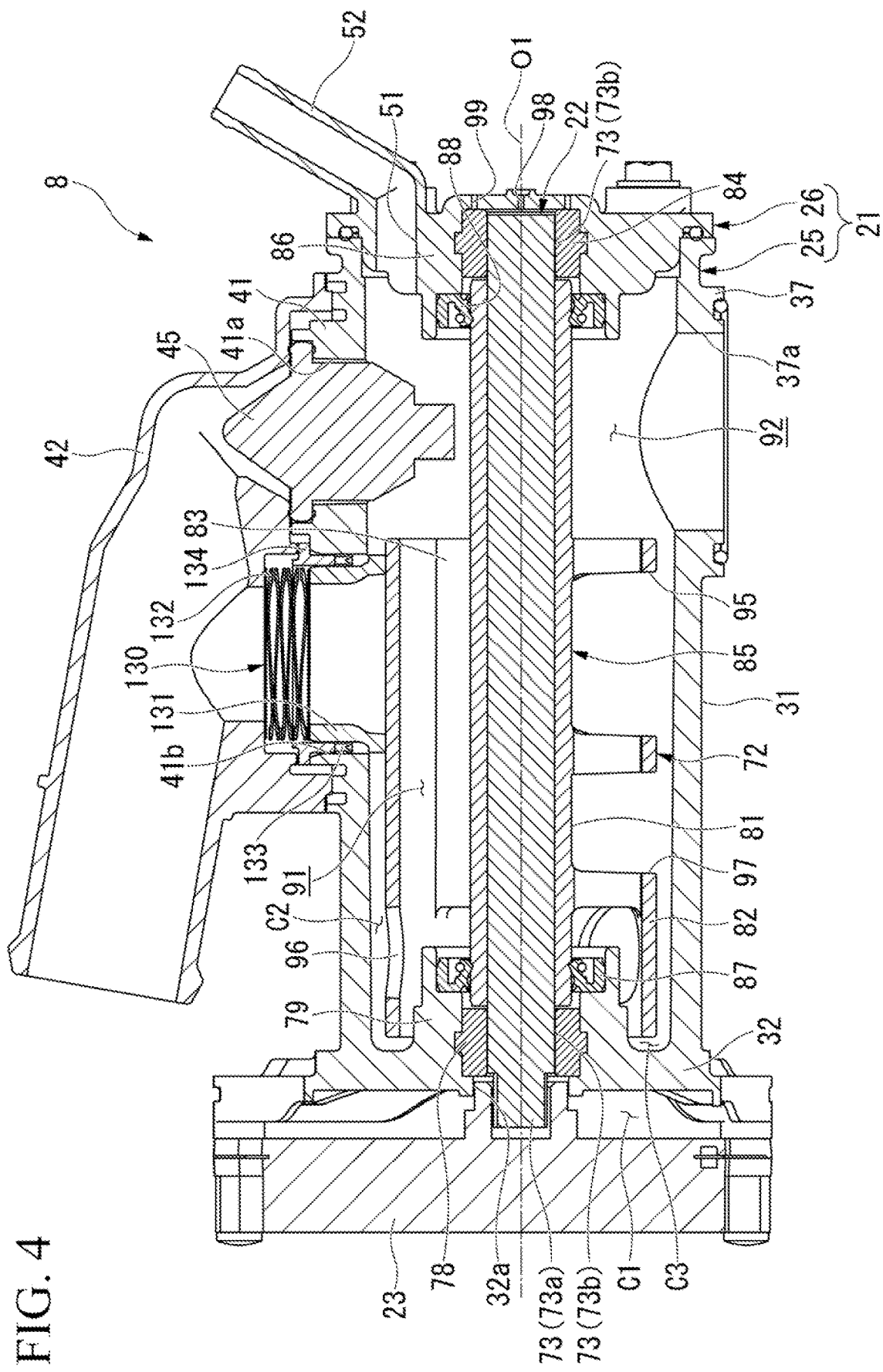
FIG. 4 is a cross-sectional view taken along the line IV-IV in FIG. 2.

FIG. 4 is a cross-sectional view taken along the line IV-IV in FIG. 2.

As shown in FIGS. 3 and 4, an inflow port 37 bulging outward in the case radial direction is formed in a portion located on the second side in the peripheral wall portion 31. An inlet 37a (see FIG. 4) penetrating the inflow port 37 in the case radial direction is formed in the inflow port 37. The inlet 37a allows the inside and outside of the casing 21 to communicate with each other. The main flow path 10 (see FIG. 1) described above is connected to an opening end surface (outer end surface in the case radial direction) of the inflow port 37.

As shown in FIG. 4, a radiator port 41 bulging outward in the case radial direction is formed in the peripheral wall portion 31 at a position facing the inflow port 37 in the case radial direction while having the axis O1 interposed therebetween. In the radiator port 41, a fail opening 41a and a radiator outlet 41b are formed side by side in the case axial direction. The fail opening 41a and the radiator outlet 41b respectively penetrate the radiator port 41 in the case radial direction. In the present embodiment, the fail opening 41a faces the above-described inlet 37a in the case radial direction.

Further, the radiator outlet 41b is located on the first side in the case axial direction with respect to the fail opening 41a.

A radiator joint 42 is connected to the opening end surface (outer end surface in the case radial direction) of the radiator port 41. The radiator joint 42 connects between the radiator port 41 and the upstream end portion of the radiator flow path 11 (see FIG. 1). It should be noted that the radiator joint 42 is welded (for example, vibration welded or the like) to the opening end surface of the radiator port 41.

A thermostat 45 is provided in the fail opening 41a. That is, the thermostat 45 is opposed to the inlet 37a described above in the case radial direction. The thermostat opens and closes the fail opening 41a in accordance with to the temperature of the cooling water flowing inside the casing 21.

An EGR outlet 51 is formed in a portion of the lid body 26 that is positioned closer to the radiator port 41 in the case radial direction with respect to the axis O1. The EGR outlet 51 penetrates the lid body 26 in the case axial direction. In the present embodiment, the EGR outlet 51 intersects (is orthogonal to) an opening direction (case radial direction) of the fail opening 41a. Further, at least a portion of the EGR outlet 51 overlaps the thermostat 45 when viewed from the front in the case axial direction.

In the lid body 26, an EGR joint 52 is formed at an opening edge of the EGR outlet 51. The EGR joint 52 is formed in a tubular shape extending outward in the case radial direction toward the second side in the case axial direction, and connects between the EGR outlet 51 and an upstream end portion of the EGR flow path 14 (see FIG. 1) described above. In the present embodiment, the EGR joint 52 is formed integrally with the lid body 26. However, the EGR joint 52 may be formed separately from the lid body 26. Further, the EGR outlet 51 and the EGR joint 52 may be provided in the peripheral wall portion 31 or the like.

As shown in FIG. 3, a warming port 56 bulging outward in the case radial direction is formed in a portion of the peripheral wall portion 31 that is located closer to the first side in the case axial direction than the radiator port 41. A warming outlet 56a penetrating the warming port 56 in the case radial direction is formed in the warming port 56. A warming joint 62 is connected to an opening end surface of the warming port 56. The warming joint 62 connects the warming port 56 and the upstream end portion of the warming flow path 12 (see FIG. 1) described above. It should be noted that the warming joint 62 is welded (for example, vibration welded or the like) to the opening end surface of the warming port 56.

As shown in FIG. 2, in the peripheral wall portion 31, an air conditioning port 66 is formed between the radiator port 41 and the warming port 56 in the case axial direction, and at a position shifted with respect to the warming port 56 by approximately 180° in the case circumferential direction. An air conditioning outlet 66a penetrating the air conditioning port 66 in the case radial direction is formed in the air conditioning port 66. An air conditioning joint 68 is connected to the opening end surface of the air conditioning port 66. The air conditioning joint 68 connects the air conditioning port 66 and an upstream end portion of the air conditioning flow path 13 (see FIG. 1) described above. It should be noted that the air conditioning joint 68 is welded (for example, vibration welded or the like) to the opening end surface of the air conditioning port 66.

(Drive Unit)

As shown in FIG. 2, the drive unit 23 is attached to the bottom wall portion 32 of the casing main body 25. The drive unit 23 is configured to accommodate a motor, a speed reduction mechanism, a control board, and the like which are not illustrated. It should be noted that as shown in FIG. 4, a gap C1 is provided between the drive unit 23 and the bottom wall portion 32 in a portion other than a fastening portion of the drive unit 23 and the bottom wall portion 32.

(Rotor)

As illustrated in FIGS. 3 and 4, the rotor 22 is accommodated inside the casing 21. The rotor 22 is formed in a cylindrical shape disposed coaxially with the axis O1 of the casing 21. The rotor 22 rotates about the axis O1 to open and close the above-described respective outlets (the radiator outlet 41b, the warming outlet 56a, and the air conditioning outlet 66a).

As shown in FIG. 4, the rotor 22 is configured by insert molding an inner shaft portion 73 inside a rotor main body 72.

The rotor main body 72 is composed of a first resin material. The first resin material will be described in detail later. The inner shaft portion 73 is formed of a material (for example, a metal material) having a hardness higher than that of the first resin material. The inner shaft portion 73 extends coaxially with the axis O1.

It should be noted that the rotor 22 may be integrally formed of the first resin material.

A first side end portion of the inner shaft portion 73 penetrates the bottom wall portion 32 in the case axial direction through a through hole (open-to-atmosphere portion) 32a formed in the bottom wall portion 32. The first side end portion of the inner shaft portion 73 is rotatably supported by a first bush (first bearing) 78 provided in the bottom wall portion 32 described above.

More specifically, a first shaft accommodation wall 79 is formed in the bottom wall portion 32 toward the second side in the case axial direction. The first shaft accommodation wall 79 surrounds the through hole 32a described above. The first bush 78 described above is fitted on the inner side of the first shaft accommodation wall 79.

A connecting portion 73a is formed in a portion of the inner shaft portion 73 that is located closer to the first side in the case axial direction than the first bush 78 (a portion located outside the bottom wall portion 32). The connecting portion 73a is formed to have a smaller diameter than a portion (large diameter portion 73b) other than the connecting portion 73a in the inner shaft portion 73, and a spline is formed on an outer peripheral surface thereof. The connecting portion 73a is connected to the drive unit 23 described above outside the casing 21. As a result, the power of the drive unit 23 is transmitted to the inner shaft portion 73.

A second side end portion of the inner shaft portion 73 is rotatably supported by a second bush (second bearing) 84 provided in the lid body 26 described above. More specifically, a second shaft accommodation wall 86 is formed in the lid body 26 toward the first side in the case axial direction. The second shaft accommodation wall 86 surrounds the axis O1 on the inner side of the EGR outlet 51 described above in the case radial direction. The second bush 84 described above is fitted on the inner side of the second shaft accommodation wall 86.

The rotor main body 72 surrounds the periphery of the inner shaft portion 73 described above. The rotor main body 72 mainly includes an outer shaft portion 81 that covers the inner shaft portion 73, a valve tube portion 82 that surrounds the outer shaft portion 81, and a spoke portion 83 that causes the outer shaft portion 81 and the valve tube portion 82 to be connected to each other.

The outer shaft portion 81 surrounds the periphery of the inner shaft portion 73 throughout the entire circumference in a state in which both of the end portions in the case axial direction in the inner shaft portion 73 are exposed. In the present embodiment, the outer shaft portion 81 and the inner shaft portion 73 constitute a rotating shaft 85 of the rotor 22.

Within the first shaft accommodation wall 79 described above, a first lip seal 87 is provided in a portion located on the second side in the case axial direction with respect to the first bush 78. The first lip seal 87 seals an area between an inner peripheral surface of the first shaft accommodation wall 79 and an outer peripheral surface of the rotating shaft 85 (outer shaft portion 81). Therefore, a portion in the first shaft accommodation wall 79 that is located on the first side in the case axial direction with respect to the first lip seal 87 is open to the atmosphere through the through hole 32a.

On the other hand, within the second shaft accommodation wall 86 described above, a second lip seal 88 is provided in a portion located on the first side in the case axial direction with respect to the second bush 84. The second lip seal 88 seals an area between an inner peripheral surface of the second shaft accommodation wall 86 and an outer peripheral surface of the rotating shaft 85 (outer shaft portion 81). A through hole (open-to-atmosphere portion) 98 penetrating the lid body 26 in the case axial direction is formed in the lid body 26. More specifically, the through hole 98 is located coaxially with the axis O1 in the lid body 26. It should be noted that in the lid body 26, an outer through hole 99 that is a trace of a pin gate at the time of resin molding is formed in a portion located on an outer side in the case radial direction with respect to the through hole 98. In the present embodiment, a plurality of outer through holes 99 are formed at intervals in the case circumferential direction around the axis O1.

It should be noted that the number, the shape, the position, and the like of the through holes 98 and the outer through holes 99 can be appropriately changed. In the second shaft accommodation wall 86, a space defined on the second side in the case axial direction with respect to the sealing portion between the rotating shaft 85 and the second lip seal 88 is open to the atmosphere through the through hole 98. Therefore, atmospheric pressure acts through the through hole 98 on the second side end portion of the rotating shaft 85 in the case axial direction (a portion in the rotating shaft 85 that is located on the second side in the case axial direction with respect to the outer shaft portion 81 sealed by the second lip seal 88). That is, it is configured to cause no differential pressure in the pressure acting on both of the end portions of the rotating shaft 85. It should be noted that the through hole 98 is not limited to being coaxial with the axis O1 as long as at least a portion thereof is formed at a position facing the inner shaft portion 73 (large diameter portion 73*b*) in the case axial direction in the lid body 26 and communicates with a portion defined by the lid body 26, the second bush 84, and the second side end surface in the large diameter portion 73*b*.

The valve tube portion 82 is disposed coaxially with the axis O1. The valve tube portion 82 is disposed inside the casing 21 in a portion located closer to the first side in the case axial direction than the inlet 37*a*. More specifically, the valve tube portion 82 is disposed at a position that avoids the fail opening 41*a* and straddles the radiator outlet 41*b*, the warming outlet 56*a*, and the air conditioning outlet 66*a* in the case axial direction. The inner side of the valve tube portion 82 constitutes a flow passage 91 through which the cooling water flowing into the casing 21 through the inlet 37*a* flows in the case axial direction. On the other hand, in the casing 21, a portion located on the second side in the case axial direction with respect to the valve tube portion 82 constitutes a connection flow path 92 communicating with the flow passage 91. It should be noted that a gap C2 is provided in the case radial direction between the outer peripheral surface (outer surface) of the valve tube portion 82 and the inner peripheral surface of the peripheral wall portion 31. In addition, a gap C3 is provided in the axial direction between the first side end surface of the valve tube portion 82 in the case axial direction and the second side end surface of the bottom wall portion 32 in the case axial direction.

In the valve tube portion 82, a radiator communication port 95 penetrating the valve tube portion 82 in the case radial direction is formed at the same position as the radiator outlet 41*b* described above in the case axial direction. In a case in which at least a portion of the radiator communication port 95 overlaps with a sliding ring 131 inserted into the radiator outlet 41*b* when viewed from the case radial direction, the radiator outlet 41*b* and the inside of the flow passage 91 communicate with each other through the radiator communication port 95.

In the valve tube portion 82, a warming communication port 96 penetrating the valve tube portion 82 in the case radial direction is formed at the same position as the warming outlet 56*a* described above in the case axial direction. In a case in which at least a portion of the warming communication port 96 overlaps with the sliding ring 131 inserted into the warming outlet 56*a* when viewed from the case radial direction, the warming outlet 56*a* and the inside of the flow passage 91 communicate with each other through the warming communication port 96.

In the valve tube portion 82, an air conditioning communication port 97 penetrating the valve tube portion 82 in the case radial direction is formed at the same position as the air conditioning outlet 66*a* described above in the case axial direction. In a case in which at least a portion of the air conditioning communication port 97 overlaps with the sliding ring 131 inserted into the air conditioning outlet 66*a* when viewed from the case radial direction, the air conditioning outlet 66*a* and the inside of the flow passage 91 communicate with each other through the air conditioning communication port 97.

The rotor 22 switches communication and shut-off between the inside of the flow passage 91 and each of the outlets 41*b*, 56*a*, and 66*a* with rotation around the axis O1. It should be noted that a communication pattern between the outlet and the communication port can be suitably set. Further, a layout of the outlet and the communication port can be switched in accordance with a set communication pattern. It should be noted that the outlet and the communication port corresponding to each other need only be disposed at positions in which at least portions thereof overlap each other in the case axial direction.

Subsequently, a connecting portion between the warming port 56 and the warming joint 62 will be described in detail.

It should be noted that since the connecting portion between the radiator port 41 and the radiator joint 42 and the connecting portion between the air conditioning port 66 and the air conditioning joint 68 have the same configuration as that of the connecting portion between the warming port 56 and the warming joint 62, the description thereof will be omitted.

Figure 5:
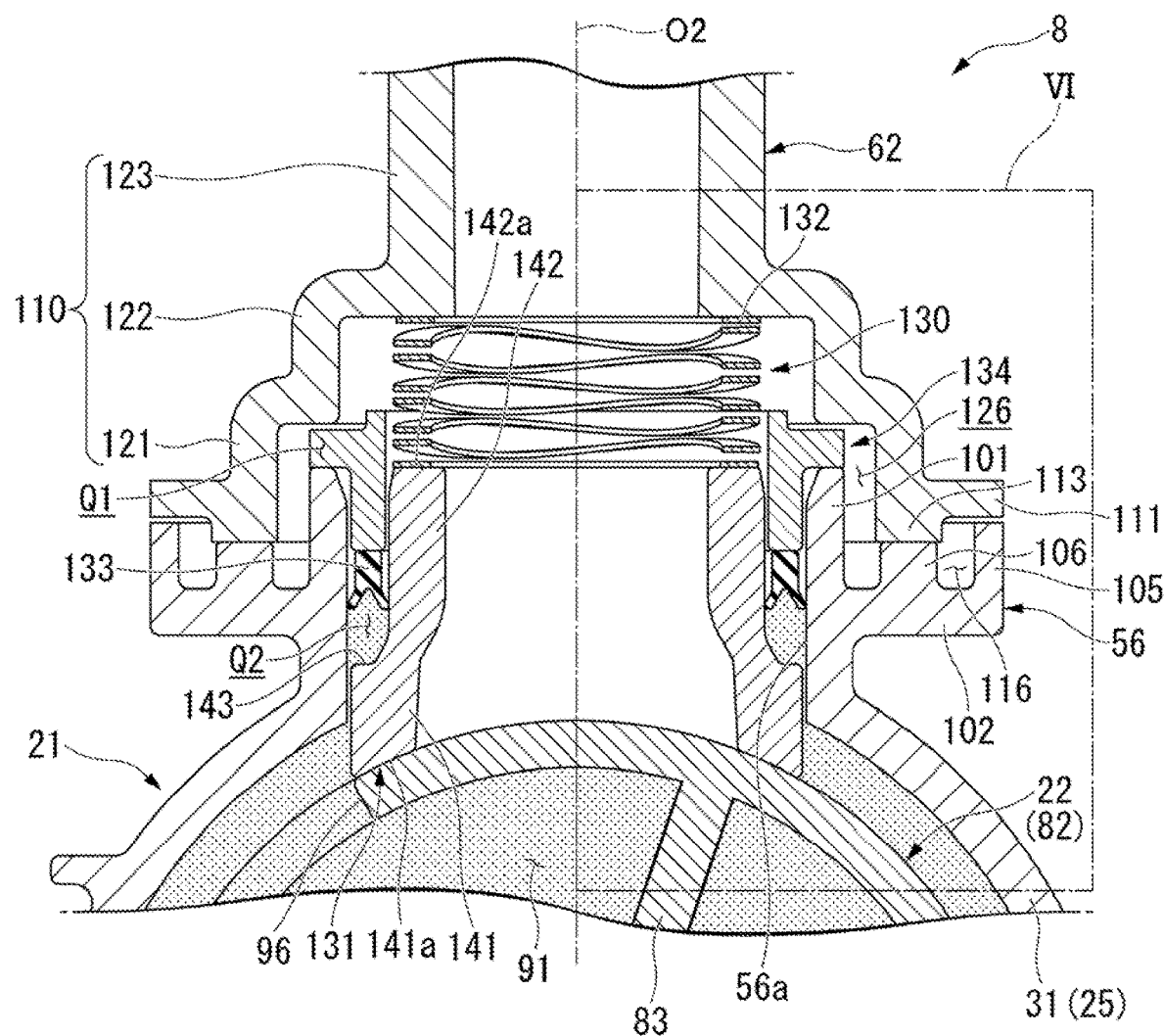
FIG. 5 is an enlarged view taken along the line V-V in FIG. 2.

FIG. 5 is an enlarged cross-sectional view corresponding to line V-V in FIG. 2. In the following description, a direction along an axis O2 of the warming outlet 56*a* will sometimes be referred to as a port axial direction (first direction). In this case, in the port axial direction, a direction toward the axis O1 with respect to the warming port 56 will be referred to as an inner side, and a direction separated from the axis O1 with respect to the warming port 56 will be referred to as an outer side. In addition, a direction orthogonal to the axis O2 will be referred to as a port radial direction (second direction), and a direction around the axis O2 will sometimes be referred to as a port circumferential direction.

As shown in FIG. 5, the warming port 56 includes a sealing tube portion (sealing wall, that is, a first restriction portion) 101 extending in the port axial direction, and a port flange portion 102 projecting outward from the sealing tube portion 101 in the port radial direction.

The inner side of the sealing tube portion 101 constitutes the warming outlet 56*a* described above. In the present embodiment, the inner diameter of the sealing tube portion 101 is uniformly set in regions excluding the outer end portion in the port axial direction.

A surrounding wall 105 protruding outward in the port axial direction is formed in an outer peripheral portion of the port flange portion 102. The surrounding wall 105 is formed throughout the entire circumference of the port flange portion 102.

In the port flange portion 102, a port joining portion 106 protruding outward in the port axial direction is formed at a portion located on the inner side in the port radial direction with respect to the surrounding wall 105. The port joining portion 106 is formed throughout the entire circumference of the port flange portion 102.

In the example of FIG. 5, the height (the dimension in the port axis direction) of the port joining portion 106 is lower than those of the sealing tube portion 101 and the surrounding wall 105. The width (the dimension in the port radial direction) of the port joining portion 106 is wider than those of the sealing tube portion 101 and the surrounding wall 105.

The warming joint 62 includes a joint tube portion 110 disposed coaxially with the axis O2, and a joint flange portion 111 protruding outward in the port radial direction from the inner end portion in the joint tube portion 110 in the port axial direction.

The joint flange portion 111 is formed into a circular shape having an outer diameter equal to that of the port flange portion 102 and an inner diameter larger than the outer diameter of the sealing tube portion 101. A joint joining portion 113 protruding inward in the port axial direction is formed in an inner peripheral portion of the joint flange portion 111. The joint joining portion 113 faces the port joining portion 106 in the port axial direction.

The warming port 56 and the warming joint 62 are joined to each other by vibration welding of facing surfaces of the port joining portion 106 and the joint joining portion 113 to each other.

In a state in which the warming port 56 and the warming joint 62 are joined, the above-described surrounding wall 105 is close to or comes into contact with the outer peripheral portion of the joint flange portion 111 in the port axial direction. A first burr accommodating portion 116 defined by the joining portions 106 and 113, the flange portions 102 and 111, and the surrounding wall 105 is formed in a region on the outer side with respect to the joining portions 106 and 113 in the port radial direction. The first burr accommodating portion 116 accommodates burrs generated at the time of joining of the warming port 56 and the warming joint 62. In this case, the surrounding wall 105 restricts burrs generated at the time of joining from scattering to the outer side in the port radial direction (outside of the casing 21).

The joint tube portion 110 extends from the inner peripheral edge of the joint flange portion 111 to the outer side in the port axial direction. The joint tube portion 110 is formed into a multistage tubular shape which is gradually reduced in diameter toward the outer side in the port axial direction. More specifically, in the joint tube portion 110, a large diameter portion 121, an intermediate diameter portion 122, and a small diameter portion 123 are arranged in order toward the outer side in the port axial direction.

The large diameter portion 121 encloses the sealing tube portion 101 in a state of having a distance on the outer side in the port radial direction with respect to the above-described sealing tube portion 101. A second burr accommodating portion 126 defined by the joining portions 106 and 113, the sealing tube portion 101, the port flange portion 102, and the joint tube portion 110 is formed in a region on the inner side with respect to the joining portions 106 and 113 in the port radial direction. The second burr accommodating portion 126 accommodates burrs generated at the time of joining of the warming port 56 and the warming joint 62. In this case, the sealing tube portion 101 restricts burrs generated at the time of joining from scattering to the inner side in the port radial direction (inside of the casing 21).

The intermediate diameter portion 122 is opposed to the sealing tube portion 101 with a gap Q1 in the port axial direction.

In the present embodiment, a sealing mechanism 130 is provided in a portion surrounded by the warming port 56 and the warming joint 62. The sealing mechanism 130 includes the sliding ring 131, a biasing member 132, a sealing ring 133, and a holder 134.

It should be noted that as shown in FIG. 3, a sealing mechanism 130 having the same configuration as that of the sealing mechanism 130 provided in the warming port 56 is also provided in the radiator port 41 and in the air conditioning port 66 described above. In the present embodiment, the sealing mechanism 130 provided in the radiator port 41 and the air conditioning port 66 is denoted by the same reference numeral as that of the sealing mechanism 130 provided in the warming port 56, and the description thereof will be omitted.

As shown in FIG. 5, the sliding ring 131 is inserted into the warming outlet 56*a*.

The sliding ring 131 extends coaxially with the axis O2, and is formed into a multistage tubular shape which is gradually reduced in outer diameter toward the outer side in the port axial direction. More specifically, it has a large diameter portion 141 located on the inner side in the port axial direction, and a small diameter portion 142 connected to the outer side in the port axial direction with respect to the large diameter portion 141.

The outer peripheral surface of the large diameter portion 141 is configured to be slidable on the inner peripheral surface of the sealing tube portion 101. That is, movement of the large diameter portion 141 with respect to the warming port 56 in the port radial direction is restricted by the sealing tube portion 101. The inner end surface of the large diameter portion 141 in the port axial direction constitutes a sliding surface 141*a* for sliding on the outer peripheral surface of the valve tube portion 82. It should be noted that in the present embodiment, the sliding surface 141*a* is a curved surface formed following the radius of curvature of the valve tube portion 82.

The outer peripheral surface of the small diameter portion 142 is connected to the outer peripheral surface of the large diameter portion 141 via a stepped surface (facing surface) 143. The stepped surface 143 is inclined outward in the port radial direction toward the inner side in the port axial direction, and then further extends outward in the port radial direction. Therefore, a sealing gap Q2 is provided in the port radial direction between the outer peripheral surface of the small diameter portion 142 and the inner peripheral surface of the sealing tube portion 101.

On the other hand, the inner peripheral surface of the small diameter portion 142 is smoothly connected to the inner peripheral surface of the large diameter portion 141. The outer end surface in the port axial direction (hereinafter referred to as "bearing surface 142*a*") of the small diameter portion 142 is formed to be a flat surface orthogonal to the port axial direction. The bearing surface 142*a* of the small diameter portion 142 is disposed at a position equivalent to the outer end surface of the sealing tube portion 101 in the port axial direction.

It should be noted that the sliding ring 131 is separated from the warming joint 62 in the port radial direction and the port axial direction.

The sliding ring 131 is composed of a second resin material. The second resin material will be described in detail later. The sliding ring 131 is typically an injection molded product or cut product of the second resin material. It may be a molded product obtained by a molding method other than injection molding or cutting.

The biasing member 132 is interposed between the bearing surface 142*a* of the sliding ring 131 and the inner end surface of the small diameter portion 123 in the port axial direction of the warming joint 62. The biasing member 132 is, for example, a wave spring. The biasing member 132 biases the sliding ring 131 toward the inner side in the port axial direction (toward the valve tube portion 82).

The sealing ring 133 is, for example, a Y-packing. The sealing ring 133 is externally inserted into the small diameter portion 142 of the sliding ring 131 in a state in which an opening portion (bifurcated portion) is directed towards the inner side in the port axial direction. More specifically, in a state in which the sealing ring 133 is disposed inside the sealing gap Q2 described above, tip portions of the bifurcated portion slidably comes into close contact with each of the outer peripheral surface of the small diameter portion 142 and the inner peripheral surface of the sealing tube portion 101. It should be noted that in an inner region with respect to the sealing ring 133 in the port axial direction inside the sealing gap Q2, a fluid pressure of the casing 21 is introduced between the inner peripheral surface of the sealing tube portion 101 and the sliding ring 131. In this case, the stepped surface 143 constitutes a pressure receiving surface which faces the sliding surface 141a on the sliding ring 131 in the port axial direction, receives a fluid pressure of cooling water inside the casing 21, and is pressed inward in the port axial direction.

Figure 6:
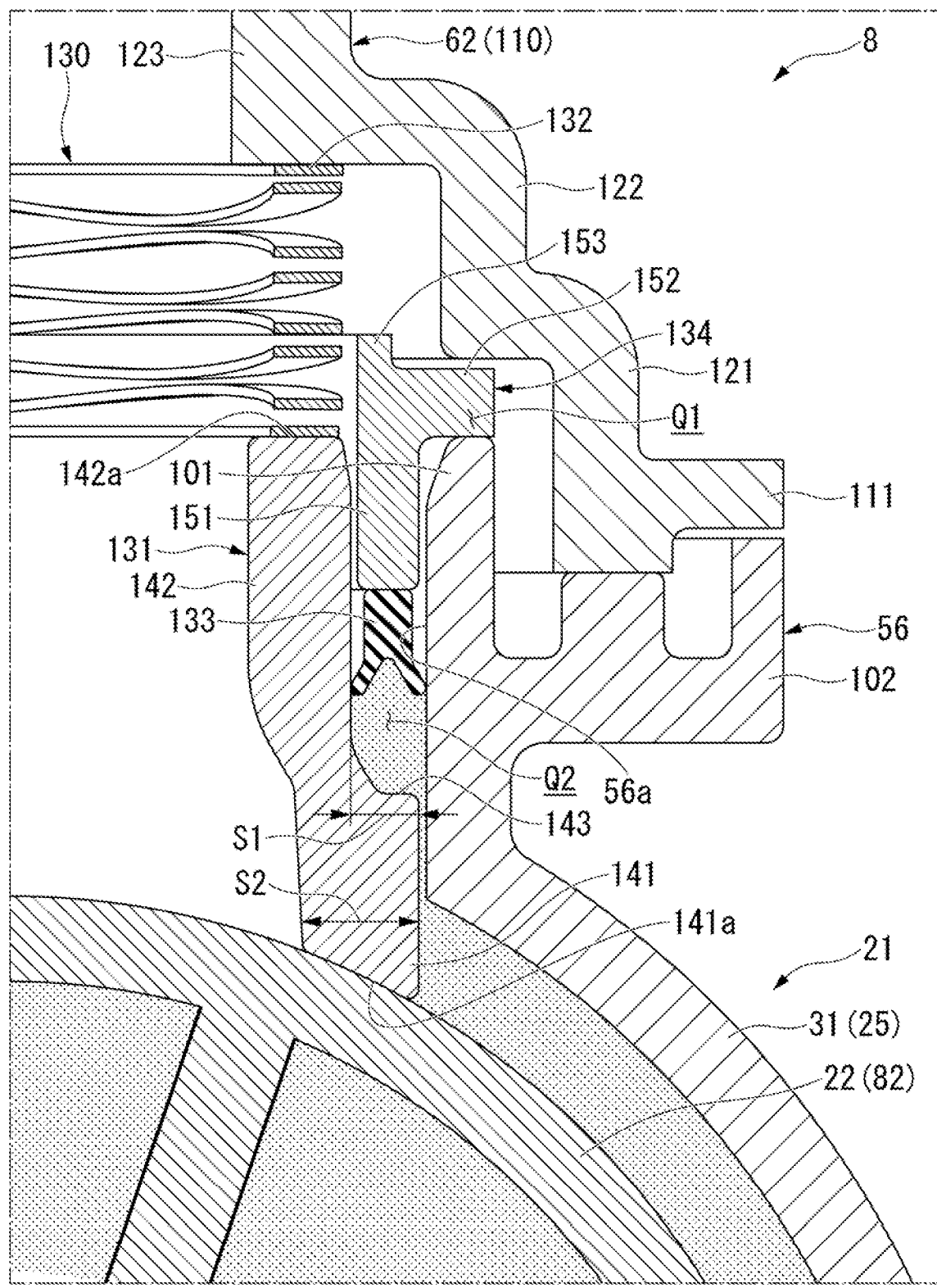
FIG. 6 is an enlarged view of a VI-section in FIG. 5.

FIG. 6 is an enlarged view of the VI-section in FIG. 5.

Here, in the sliding ring 131, an area S1 of the stepped surface 143 and an area S2 of the sliding surface 141a are set so as to satisfy the following expressions (1) and (2).

$$S1 < S2 \le S1/k \quad (1)$$

$$\alpha \le k < 1 \quad (2)$$

k: Pressure reduction constant of cooling water flowing through a very small gap between the sliding surface 141a and the valve tube portion 82

α: Lower limit value for the pressure reduction constant determined based on physical properties of cooling water It should be noted that the area S1 of the stepped surface 143 and the area S2 of the sliding surface 141a denote areas when being projected in the port axial direction.

The factor α in expression (2) is a standard value for the pressure reduction constant determined based on the type of cooling water, the usage environment (for example, temperature), and the like. For example, in the case of water under normal usage conditions, the value becomes α=½. When the physical properties of the cooling water to be used change, the value changes to α=⅓, or the like.

Further, when the sliding surface 141a is uniformly in contact with the valve tube portion 82 from the outer edge to the inner edge in the port radial direction, the pressure reduction constant k in expression (2) becomes α (for example, ½) which is a standard value of the pressure reduction constant. However, due to a manufacturing error, an assembling error or the like of the sliding ring 131, the gap between the outer peripheral portion of the sliding surface 141a and the valve tube portion 82 slightly increases with respect to the inner peripheral portion of the sliding surface 141a in some cases. In this case, the pressure reduction constant k in expression (2) gradually approaches k=1.

In the present embodiment, on the premise that there is a very small gap between the sliding surface 141a of the sliding ring 131 and the outer peripheral surface of the valve tube portion 82 to allow sliding, the relationship between the areas S1 and S2 of the stepped surface 143 and the sliding surface 141a is determined by expressions (1) and (2).

That is, as described above, a pressure of the cooling water inside the casing 21 directly acts on the stepped surface 143 of the sliding ring 131. On the other hand, the pressure of the cooling water inside the casing 21 does not directly act on the sliding surface 141a. More specifically, the pressure of the cooling water acts while the pressure is reduced when the cooling water flows through a very small gap between the sliding surface 141a and the valve tube portion 82 from the outer edge toward the inner edge in the port radial direction. At this time, the pressure of the cooling water gradually decreases toward the inner side in the port radial direction and tends to push the sliding ring 131 outward in the port axial direction.

As a result, a force obtained by multiplying the area S1 of the stepped surface 143 by a pressure P inside the casing 21 directly acts on the stepped surface 143 of the sliding ring 131. On the other hand, a force obtained by multiplying the area S2 of the sliding surface 141a by the pressure P inside the casing 21 and the pressure reduction constant k acts on the sliding surface 141a of the sliding ring 131.

In the valve device 8 of the present embodiment, as is apparent from expression (1), the areas S1 and S2 are set so that a relationship of k×S2≤S1 is established. For this reason, a relationship of P×k×S2≤P×S1 is also established.

Therefore, a force F1 (F1=P×S1) in a pressing direction acting on the stepped surface 143 of the sliding ring 131 increases to be equal to or greater than a force F2 (F2=P×k×S2) in a rising direction acting on the sliding surface 141a of the sliding ring 131. Accordingly, in the valve device 8 of the present embodiment, a space between the sliding ring 131 and the valve tube portion 82 can also be sealed only by the relationship related to the pressure of the cooling water inside the casing 21.

On the other hand, in the present embodiment, as described above, the area S1 of the stepped surface 143 of the sliding ring 131 is smaller than the area S2 of the sliding surface 141a. For this reason, even if the pressure of the cooling water inside the casing 21 increases, it is possible to suppress the sliding surface 141a of the sliding ring 131 from being pressed against the valve tube portion 82 with an excessive force. Therefore, when the valve device 8 of the present embodiment is employed, it is possible to avoid an increase in size and output of the drive unit 23 that rotationally drives the rotor 22, and early wear of the sliding ring 131 and each of the bushes 78 and 84 (see FIG. 4) can be suppressed.

As described above, in the present embodiment, within a range in which a pressing force to the inner side in the port axial direction acting on the sliding ring 131 does not fall below a rising force to the outer side in the port axial direction acting on the sliding ring 131, the area S2 of the sliding surface 141a is set to be greater than the area S1 of the stepped surface 143. Therefore, it is possible to seal between the sliding ring 131 and the valve tube portion 82 while suppressing the pressing of the sliding ring 131 against the valve tube portion 82 with an excessive force.

In the present embodiment, the drive unit 23 is configured to rotationally drive the rotor 22 at a peripheral speed of 3 m/min or less. The peripheral speed corresponds to the sliding speed of the sliding surface 141a with respect to the outer peripheral surface of the rotor 22. Since the sliding speed is slow, even if the wear coefficient of the sliding surface 141a is large, melting and excessive wear of the sliding ring 131 can be suppressed, and the sealing performance can be maintained for a long period of time. The sliding speed is preferably 2 m/min or less.

Figure 7:
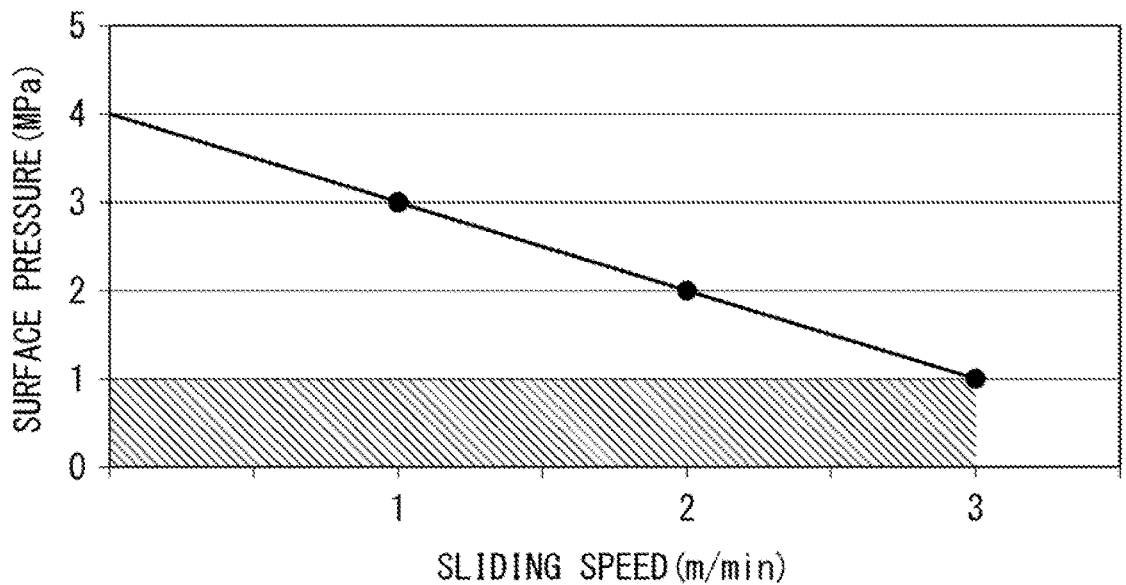
FIG. 7 is a graph for explaining a preferable surface pressure with respect to a sliding speed.

Further, when the sliding speed (m/min) of the sliding surface 141a with respect to the outer peripheral surface of the rotor 22 is denoted as x and the surface pressure (Pa) at which the valve device 8 is slidable is denoted as y, the valve device 8 is preferably configured to satisfy a relationship of x+y≤4. For example, as shown in FIG. 7, when the sliding speed of the sliding surface 141a with respect to the outer peripheral surface of the rotor 22 is 3 m/min, it is preferably configured to be slidable at a surface pressure of 1 MPa or less. When the sliding speed is 2 m/min, it is preferably configured to be slidable at a surface pressure of 2 MPa or less. When the sliding speed is 1 m/min, it is preferably configured to be slidable at a surface pressure of 3 MPa or less.

The valve device 8 is preferably configured to be slidable at a surface pressure of 1 MPa or less and a sliding speed of 3 m/min or less. In other words, it is preferable that the sliding speed (m/min) and the surface pressure (MPa) are present within a hatched region in FIG. 7 (0 m/min≤sliding speed≤3 m/min, 0 MPa<surface pressure≤1 MPa). If the surface pressure is 1 MPa or less, melting and excessive wear of the sliding ring 131 can be suppressed more effectively.

The valve device 8 is particularly preferably configured to be slidable at a surface pressure of 1 MPa or less and a sliding speed of 2 m/min or less.

The lower limit of the sliding speed is, for example, 0 m/min.

The lower limit of the surface pressure is, for example, 0.02 MPa.

In the present embodiment, the large diameter portion 141 of the sliding ring 131 is formed with a wear allowance. Therefore, even if the inner end portion in the port axial direction of the large diameter portion 141 is worn and the sliding surface 141*a* is retracted to the outer side in the port axial direction, within the range of the wear allowance, a space between the sliding ring 131 and the valve tube portion 82 can be sealed.

The wear allowance is set, for example, in a range of 0.5 to 10 mm.

The holder 134 described above is configured to be movable in the port axial direction with respect to the warming port 56 and the warming joint 62 inside the sealing gap Q2. Further, the holder 134 is disposed in at least one of the warming port 56 and the warming joint 62 so as to be separable in the port axial direction. More specifically, the holder 134 includes a holder tube portion 151, a holder flange portion 152, and a restriction portion 153.

The holder tube portion 151 extends in the port axial direction. The holder tube portion 151 is inserted into the sealing gap Q2 described above from the outer side in the port axial direction. A bottom portion of the sealing ring 133 described above is configured to be contactable with the inner end surface in the port axial direction of the holder tube portion 151. That is, the holder tube portion 151 restricts the movement of the sealing ring 133 to the outer side in the port axial direction.

The holder 134 of the present embodiment surrounds the small diameter portion 142 in a state in which the holder tube portion 151 is wrapped by the small diameter portion 142 in the port axial direction. In this case, the holder 134 partitions between the warming port 56 and the warming joint 62, and the sliding ring 131 in a state of being separated from the warming joint 62 and the sliding ring 131, and restricts movement of the sliding ring 131 in the port radial direction. It should be noted that the holder tube portion 151 may be configured to be press-fitted into the sealing tube portion 101 or may be configured to slide with respect to the sealing tube portion 101 or the sliding ring 131, as long as it is configured to be contactable with the sealing ring 133 in the port axial direction.

The holder flange portion 152 protrudes from the outer end portion in the port axial direction in the holder tube portion 151 to the outer side in the port radial direction. The holder flange portion 152 is disposed in the gap Q1 between the outer end surface of the sealing tube portion 101 in the port axial direction and the inner end surface of the intermediate diameter portion 122 in the port axial direction. The thickness of the holder flange portion 152 in the port axial direction is thinner than the gap Q1. Therefore, the holder 134 is configured to be movable in the port axial direction by a difference in thickness between the gap Q1 and the holder flange portion 152 in the port axial direction.

In this case, movement of the holder 134 to the inner side in the port axial direction is restricted by the sealing tube portion 101. On the other hand, movement of the holder 134 to the outer side in the port axial direction is restricted by the intermediate diameter portion 122. Therefore, the sealing ring 133 is held at a desired position (between the outer peripheral surface of the small diameter portion 142 and the inner peripheral surface of the sealing tube portion 101).

At the time of joining the warming port 56 and the warming joint 62 and the like (in a state in which no fluid pressure is acting on the sealing ring 133), when the valve device 8 is mounted while the inner side in the port axial direction is directed downward in the direction of gravity, the holder flange portion 152 is supported by the sealing tube portion 101 in the port axial direction. In addition, the holder flange portion 152 is held while being separated from the warming joint 62.

It should be noted that the holder 134 need only be separated from at least the warming joint 62 at the time of joining the warming port 56 and the warming joint 62 to each other as described above. The expression "separated" referred to here means that the holder 134 (holder flange portion 152) and the warming joint 62 (intermediate diameter portion 122) have a gap of 50 μm or greater therebetween in the port axial direction. However, when a fluid pressure acts on the sealing ring 133, in a case where the holder 134 moves to the outer side in the port axial direction with respect to the warming joint 62, the holder flange portion 152 may come into contact with the intermediate diameter portion 122 in the port axial direction.

The restriction portion 153 is formed into a tubular shape protruding from the inner peripheral portion of the holder tube portion 151 to the outer side in the port axial direction. The restriction portion 153 restricts movement of the biasing member 132 in the port radial direction together with the holder tube portion 151. The restriction portion 153 further protrudes to the outer side in the port axial direction than the inner end surface of the intermediate diameter portion 122 described above in the port axial direction. The restriction portion 153 is separated in the port radial direction with respect to the intermediate diameter portion 122 of the joint tube portion 110 and is separated in the port axial direction with respect to the small diameter portion 123. It should be noted that the restriction portion 153 is not limited to having a tubular shape, and may be formed intermittently in the port circumferential direction.

For example, the warming port 56 and the warming joint 62 described above are assembled by the following method.

First, after inserting the sliding ring 131 into the warming outlet 56*a*, the sealing ring 133, the holder 134, and the biasing member 132 are set in order. At this time, it is preferable to push the holder 134 and the sealing ring 133 to a position where the holder flange portion 152 of the holder 134 comes into contact with the sealing tube portion 101 in the port axial direction.

Subsequently, the warming joint 62 is set to the warming port 56 so that the joint joining portion 113 of the warming joint 62 and the port joining portion 106 of the warming port 56 comes into contact with each other, and then both the joining portions 106 and 113 are subjected to vibration welding. At this time, in a state in which the holder 134 and the warming joint 62 are separated from each other, both the joining portions 106 and 113 are subjected to vibration welding.

It should be noted that the connecting portion between the radiator port 41 and the radiator joint 42 and the connecting portion between the air conditioning port 66 and the air conditioning joint 68 can also be assembled by the same method as the method described above.

[First Resin Material]

The first resin material includes a first resin as a main component. The first resin material may include a resin other than the first resin. The first resin material may include a component other than the resin.

The term "main component" means a resin having the highest content among the resins included in the resin material. For example, when there are two resins included in the resin material, the content of the main component is more than 50% by mass with respect to the total mass of all the resins included in the resin material.

The first resin is preferably a component having the highest content among the components included in the first resin material. For example, when there are two components included in the first resin material, the content of the first resin is preferably more than 50% by mass with respect to the total mass of the first resin material.

Examples of the first resin include polyphenylene sulfides (PPS), aromatic polyether ketones (for example, polyether ether ketone (PEEK)), polyamides (PA), liquid crystal polymers, fluororesins, polyacetals, and syndiotactic polystyrenes. Among these, a resin selected from the group consisting of PPS, PEEK, and PA is preferable in view of thermal and mechanical properties.

Examples of PA include aliphatic polyamides, semi-aromatic polyamides and aromatic polyamides, and for example, PA6, PA66, PA46, PA610, PA612, PA11, PA12, PA6T, PA9T, PA10T, PA6T/PA11 copolymers, PA6T/PA12 copolymers, PA6T/PA66 copolymers, PA6T/PA6I copolymers, PA6T/PA6I/PA66 copolymers, hexamethylenediamine/2-methyl-1,5-pentamethylenediamine/terephthalic acid copolymers, polypentamethylene terephthalamide, polymetaxylylene adipamide (MXD6), and polyphthalamide (PPA) can be mentioned.

It should be noted that "PA6T/PA11 copolymers" indicate copolymers of PA6T and PA11, and the same also applies to other copolymers.

As the first resin, a resin selected from the group consisting of PPS, PEEK and PA is preferable, PPS, PEEK, PA6 or PA66 is more preferable, and PPS is particularly preferable.

When the first resin is the above resin, it is possible to configure the outer peripheral surface of the rotor 22 (outer peripheral surface of the valve tube portion 82) and the sliding surface 141a of the sliding ring 131 from resin materials having the same type of resin as a main component, while improving both the hardness and impact resistance characteristics of the outer peripheral surface of the rotor 22 and the low friction and low wear characteristics of the sliding surface of the sliding ring 131. Moreover, the production cost can be reduced since the above resin can be injection molded.

In particular, when the first resin is PPS (and hence the second resin is also PPS), the creep resistance of each of the outer peripheral surface of the rotor 22 and the sliding surface 141a of the sliding ring 131 is further improved, the deterioration of the sealing performance due to creep can be suppressed, and the sealing performance can be maintained over a long period of time.

Examples of other resins include polytetrafluoroethylene (PTFE). As the other resin, the resin exemplified as the first resin (but different from the first resin) may be used.

Examples of other components include inorganic fillers.

The inorganic filler may be in, for example, a fibrous form, a plate-like form, a powder form, a particulate form or the like. Specific examples of the inorganic filler include glass fibers, carbon fibers (PAN-based fibers, pitch-based fibers, and the like) and mineral powders.

Any one of these other components may be used alone, or two or more components may be used in combination.

The first resin material preferably contains a glass fiber from the viewpoints of the hardness and impact resistance of the rotor 22.

The content of the first resin in the first resin material can be appropriately selected within a range in which the first resin is a main component. As a result of the first resin being the main component, the characteristics of the first resin are sufficiently exhibited, and the difference in thermal characteristics such as the linear expansion coefficient between the first resin material and the second resin material can be further reduced.

The linear expansion coefficient of the first resin material is preferably from $1 \times 10^{-5}$ to $10 \times 10^{-5}$/K, and more preferably from $1 \times 10^{-5}$ to $6 \times 10^{-5}$/K. When the linear expansion coefficient is within the above range, the sealing performance is further improved.

The linear expansion coefficient is an average expansion coefficient at $-30$ to $90°$ C., and is measured in accordance with ASTM D696 using a thermomechanical analyzer (TMA).

[Second Resin Material]

The second resin material includes a second resin as a main component. The second resin material may include a resin other than the second resin. The second resin material may include a component other than the resin.

The term "main component" has the same meaning as defined above. For example, when there are two resins included in the second resin material, the content of the second resin is more than 50% by mass with respect to the total mass of all the resins included in the second resin material.

The second resin is preferably a component having the highest content among the components included in the second resin material. For example, when there are two components included in the second resin material, the content of the second resin is preferably more than 50% by mass with respect to the total mass of the second resin material.

The second resin is the same type of resin as the first resin.

The expression "same type" indicates that structures characterizing the resins, for example, the essential monomer units are the same. The average molecular weights, the ratios of each monomer unit in the case of containing two or more types of monomer units, and the like may be different. For example, PA6T and PA10T are the same type of resin because they both have a polyamide structure.

The first resin and the second resin preferably belong to any one of PPS, PEEK, and PA, and are particularly preferably both PPS.

Examples of other resins include the same as those mentioned as the other resins in the first resin material.

Examples of other components include the same as those mentioned as the other components in the first resin material.

The second resin material preferably contains one or both of a carbon fiber and PTFE from the viewpoints of low friction and low wear characteristics of the sliding surface.

The content of the second resin in the second resin material can be appropriately selected within a range in which the second resin is a main component. As a result of the second resin being the main component, the characteristics of the second resin are sufficiently exhibited, and the difference in thermal characteristics such as the linear expansion coefficient between the first resin material and the second resin material can be further reduced.

The linear expansion coefficient of the second resin material is preferably from to 250%, and more preferably from 50 to 200% with respect to the linear expansion coefficient of the first resin material. The smaller the difference between the linear expansion coefficients of the first resin and the second resin, the more the gap generated between the outer peripheral surface of the rotor 22 and the sliding surface 141a of the sliding ring 131 can be reduced when the dimensions of the rotor 22 and the sliding ring 131 change due to a temperature change.

[Operation Method of Valve Device]

Next, a method of operating the valve device 8 described above will be described.

As shown in FIG. 1, in the main flow path 10, the cooling water delivered by the water pump 3 circulates toward the valve device 8 after heat exchange is performed in the engine 2. As shown in FIG. 4, the cooling water which has passed through the engine 2 in the main flow path 10 flows into the connection flow path 92 in the casing 21 through the inlet 37a.

In the cooling water which has flowed into the connection flow path 92, a portion of the cooling water flows into the EGR outlet 51. The cooling water which has flowed into the EGR outlet 51 is supplied into the EGR flow path 14 through the EGR joint 52. The cooling water supplied into the EGR flow path 14 is returned to the main flow path 10 after heat exchange between the cooling water and the EGR gas is performed in the EGR cooler 7.

On the other hand, in the cooling water which has flowed into the connection flow path 92, the cooling water which has not flowed into the EGR outlet 51 flows into the flow passage 91 from the second side in the case axial direction. The cooling water which has flowed into the flow passage 91 is distributed to each of the outlets in the course of flowing through the inside of the flow passage 91 in the case axial direction. That is, the cooling water flowing into the flow passage 91 is distributed to each of the flow paths 11 to 13 through the outlet communicating with the communication port among the outlets.

In the valve device 8, in order to switch the communication pattern between the outlet and the communication port, the rotor 22 is rotated around the axis O1. Then, by stopping the rotation of the rotor 22 at a position corresponding to the communication pattern intended to be set, the outlet and the communication port communicate with each other in a communication pattern corresponding to the stop position of the rotor 22.

As described above, in the present embodiment, it is configured so that the outer peripheral surface of the rotor 22 and the sliding surface 141a of the sliding ring 131 are composed of a resin material containing the same type of resin as a main component.

Since the first resin material forming the outer peripheral surface of the rotor 22 and the second resin material forming the sliding surface 141a of the sliding ring 131 contain the same type of resin as a main component, there is little difference in thermal characteristics such as a linear expansion coefficient.

Therefore, according to the above configuration, when the dimensions of the rotor 22 and the sliding ring 131 change due to a temperature change, since the difference in dimensional change due to expansion or contraction of each resin material is small, even if the dimensions change, a gap generated between the outer peripheral surface of the valve and the sliding surface of the sliding ring can be reduced, and the amount of fluid leaking from the gap can be reduced.

Further, according to the above configuration, the sliding surface 141a has a high wear coefficient and wears easily as compared to cases where the outer peripheral surface of the rotor 22 is composed of PPS and the sliding surface 141a of the sliding ring 131 is composed of PTFE. Therefore, even if there is a dimensional error on the outer peripheral surface of the rotor 22 or the sliding surface 141a of the sliding ring 131 immediately after production, the dimensional error is reduced due to wear of the sliding surface 141a, and the sealing performance improves.

It should be noted that the technical scope of the present invention is not to be considered as being limited to the above-described embodiments, and includes those in which various modifications are made to the above-described embodiments without departing from the spirit of the present invention.

For example, in the embodiment described above, a configuration in which the valve device 8 is mounted in the cooling system 1 of the engine 2 has been described, but the present invention is not limited to only this configuration, and the valve device 8 may be mounted in other systems.

In the embodiment described above, a configuration in which the cooling water flowing into the valve device 8 is distributed to the radiator flow path 11, the warming flow path 12, the air conditioning flow path 13 and the EGR flow path 14 has been described, but the present invention is not limited to only this configuration. The valve device 8 may have any configuration as long as it distributes the cooling water flowing into the valve device 8 to at least two flow paths.

In addition, the layout, the type, the shape, and the like of each of the communication ports and the outlets can also be suitably changed.

In the embodiment described above, for example, a configuration in which the inlets, each of the communication ports, and each of the outlets penetrate the valve tube portion 82 and the casing 21 in the case radial direction, respectively, has been described, but the present invention is not limited to only this configuration. For example, each of the communication ports and each of the outlets may penetrate the valve tube portion 82 and the casing 21 in the case axial direction, respectively.

In the embodiment described above, a case in which vibration welding is employed for joining the outflow port and the joint has been described, but the present invention is not limited to only this configuration, and various welding methods (ultrasonic welding or the like), adhesion, or the like may be employed.

In the embodiment described above, a configuration in which the sealing tube portion 101 also serves as the sealing wall and the first restriction portion has been described, but the present invention is not limited to only this configuration. That is, the sealing wall and the first restriction portion may be separately configured.

In the embodiment described above, a configuration in which the holder 134 is disposed to be separable in the port axial direction with respect to the warming joint 62, and a configuration in which the holder 134 is disposed to be separable in the port axial direction with respect to both the warming port 56 and the warming joint 62 have been described, but the present invention is not limited to only these configurations. That is, the holder 134 may be disposed in a separable manner in at least any of the warming port 56 and the warming joint 62. In this case, the holder 134 may be disposed in only the warming port 56 in a separable manner (may come into contact with the warming joint 62). Further, the holder 134 and at least one of the warming port 56 and the warming joint 62 may be disposed so as to be separable in the port radial direction.

In the embodiment described above, a configuration in which the valve is the rotor 22 having a cylindrical shape and the rotor 22 is rotatably accommodated in the casing main body 25 has been described, but the present invention is not limited to only this configuration.

The valve may be another valve having a shape other than a cylindrical shape. Examples of other valves include a rotor having a spherical shape or the like and a slider. The slider is, for example, a plate-like valve in which a communication port communicating with the outlet is formed. The slider is accommodated in the casing main body 25 and configured to be slidable inside the casing main body 25. In the process of sliding the slider, when at least portions of the outlet and the communication port overlap, the outlet and the communication port communicate with each other through the sliding ring.

When a configuration is adopted in which a slider is used instead of the rotor 22, the slider is preferably slidable at a speed of 3 m/min or less, and more preferably slidable at a peripheral speed of 2 m/min or less. Further, the surface pressure acting between the outer surface of the slider and the sliding surface of the sliding ring at the time of sliding the slider is preferably 1 MPa or less.

Furthermore, the constituent elements in the above-described embodiment can be suitably replaced with known constituent elements without departing from the spirit or scope of the present invention. In addition, the above-described modified examples may be suitably combined.

EXAMPLES

Hereinafter, the present invention will be described in more detail with reference to examples and comparative examples, but the present invention is not limited to these examples.

Example 1

A rotor 22 (valve) and a sliding ring 131 were produced by the following procedure. Using the rotor 22 and the sliding ring 131, a valve device having the same configuration as that of the valve device 8 according to the above-described embodiment was produced.

The following resin material A1 was used as a first resin material, and a rotor main body 72 was insert molded with respect to an inner shaft portion 73 to produce the rotor 22.

Resin material A1: a resin material containing PPS as a main component of resin (linear expansion coefficient: $2 \times 10^{-5}$/K).

The following resin material A2 was injection molded as a second resin material to produce the sliding ring 131.

Resin material A2: a resin material containing PPS as a main component of resin (linear expansion coefficient: $4 \times 10^{-5}$/K).

Example 2

A valve device was produced in the same manner as in Example 1 except that the first resin material was changed to the following resin material B1 and the second resin material was changed to the following resin material B2.

Resin material B1: a resin material containing PEEK as a main component of resin (linear expansion coefficient: $5 \times 10^{-5}$/K).

Resin material B2: a resin material containing PEEK as a main component of resin (linear expansion coefficient: $3 \times 10^{-5}$/K).

Example 3

A valve device was produced in the same manner as in Example 1 except that the first resin material was changed to the following resin material C1 and the second resin material was changed to the following resin material C2.

Resin material C1: a resin material containing PA66 as a main component of resin (linear expansion coefficient: $3 \times 10^{-5}$/K).

Resin material C2: a resin material containing PA6 as a main component of resin (linear expansion coefficient: $7.5 \times 10^{-5}$/K).

Comparative Example 1

A valve device was produced in the same manner as in Example 1 except that the first resin material was changed to the following resin material D1 and the second resin material was changed to the following resin material D2.

Resin material D1: a resin material containing PPS as a main component of resin (linear expansion coefficient: $2 \times 10^{-5}$/K).

Resin material D2: a resin material containing PTFE as a main component of resin (linear expansion coefficient: $10 \times 10^{-5}$/K).

(Evaluation of Creep Resistance)

For the valve devices of Examples 1 to 3 and Comparative Example 1, the creep property was evaluated in accordance with ASTM D621 under conditions of a surface pressure of 13.7 MPa, room temperature, and 24 hours. The results are shown in Table 1.

<Evaluation Criteria>

A: The creep property was 1% or less.

B: The creep property was more than 1% and not more than 10%.

C: The creep property exceeded 10%.

(Evaluation of Difference in Linear Expansion Coefficient)

The ratios (%) of the linear expansion coefficients (/K) of the second resin materials with respect to the linear expansion coefficients (/K) of the first resin materials used in Examples 1 to 3 and Comparative Example 1 were calculated and evaluated by the following criteria. The results are shown in Table 1.

<Evaluation Criteria>

A: The above ratio was 50% or more and 200% or less.

B: The above ratio was 40% or more and less than 50%, or more than 200% and 250% or less.

C: The above ratio was less than 40%, or more than 250%.

(Evaluation of Leakage Amount)

For the valve devices of Example 1 and Comparative Example 1, the leakage amount of cooling water (11LLC manufactured by Honda Motor Co., Ltd., concentration: 50±2%) at 25° C. or 80° C. was measured by the following procedure. The ambient temperature was the same as the cooling water temperature.

(1) Flow paths provided with a valve were connected to each of the radiator joint 42, the warming joint 62, the air conditioning joint 68, and the EGR joint 52 of the valve device 8, and all of these flow paths were closed.

(2) The rotational position of the rotor 22 of the valve device 8 was set to a position such that any of the radiator communication port 95, the warming communication port 96 and the air conditioning communication port 97 of the rotor 22 did not overlap with the sliding ring 131.

(3) A pressure tank storing the cooling water and the inflow port 37 of the valve device 8 were connected by a flow path equipped with a valve. Air was supplied to the pressure tank, and the cooling water was pressurized with air. As a result, the cooling water in the pressure tank was supplied to the inflow port 37, and pressure was applied to the inside of the casing 21.

(4) The valve of the flow path connected to the joint (the warming joint 62 in this example) at the point where the leakage amount was measured was opened, and the joint side at the point where the leakage amount was measured was opened to the atmosphere. While gradually increasing the pressure by air, the amount of the coolant flowing out from the flow path was measured with an electronic balance, and the measured value was taken as the leakage amount.

Figure 8:
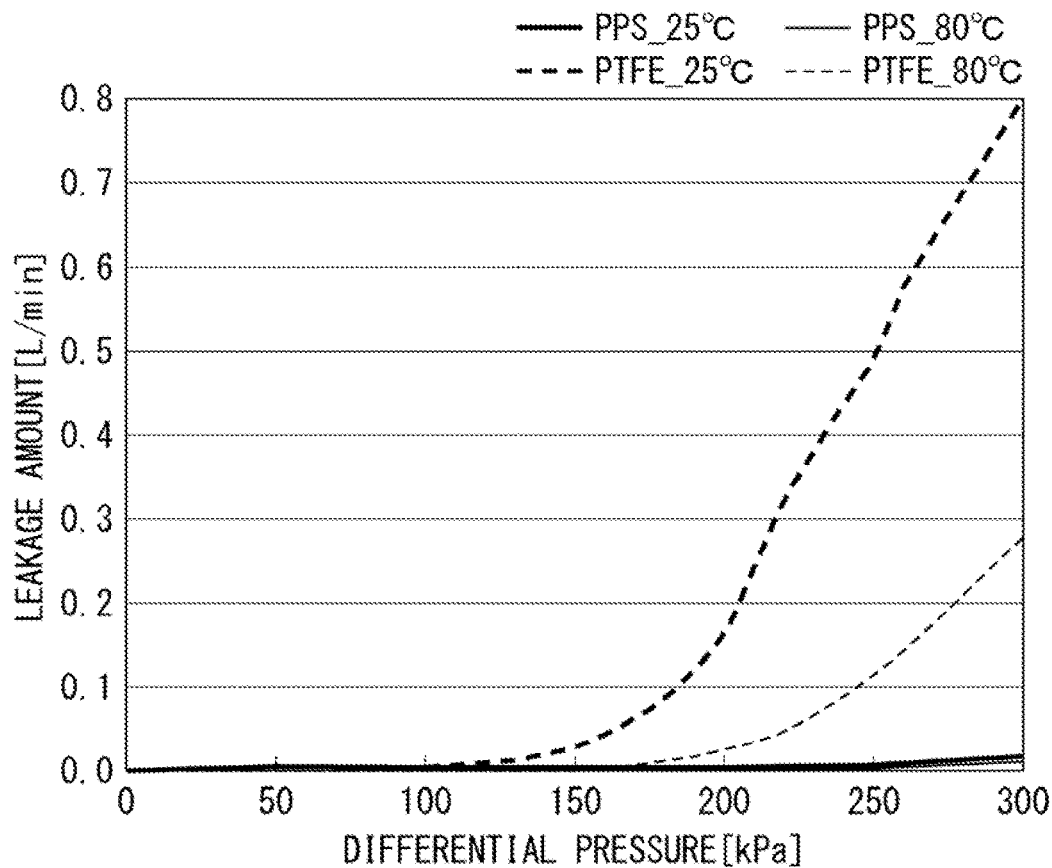
FIG. 8 is a graph showing the measurement results of the leakage amount in Example 1 and Comparative Example 1.

The results are shown in FIG. 8. FIG. 8 is a graph in which the horizontal axis represents the differential pressure (kPa) between the flow passage 91 of the casing main body 25 and the inside of the sliding ring 131, and the vertical axis represents the leakage amount (L/min). In FIG. 8, "PPS_25° C." and "PPS_80° C." are the results of Example 1 when the cooling water temperatures are 25° C. and 80° C., respectively, and "PTFE_25° C." and "PTFE_80° C." are the results of Comparative Example 1 when the cooling water temperatures are 25° C. and 80° C., respectively.

In addition, a ratio of the leakage amount (L/min) at a cooling water temperature of 80° C. with respect to the leakage amount (L/min) at a cooling water temperature of 25° C. (hereinafter also referred to as "rate of change in leakage amount") (%) when the differential pressure is 300 kPa is shown in Table 2.

TABLE 1

|  | Example 1 | Example 2 | Example 3 | Comparative Example 1 |
|---|---|---|---|---|
| First resin (valve) | PPS | PEEK | PA66 | PPS |
| Second resin (sliding ring) | PPS | PEEK | PA6 | PTFE |
| Creep property | A | A | B | C |
| Difference in linear expansion coefficient | A | A | B | C |

TABLE 2

|  |  | Example 1 | Comparative Example 1 |
|---|---|---|---|
| Second resin |  | PPS | PTFE |
| Leakage amount when the differential pressure is 300 kPa [L/min] | 25° C. | 0.012 | 0.278 |
|  | 80° C. | 0.018 | 0.800 |
| Rate of change in leakage amount [%] |  | 150 | 288 |

As shown in Table 1, as compared with the valve device of Comparative Example 1, in the valve devices of Examples 1 to 3, the creep resistance was excellent, and the difference in linear expansion coefficient between the first resin material and the second resin material was small.

As shown in FIG. 8 and Table 2, in the valve devices of Examples 1 to 3, leakage of cooling water was suppressed, as compared with the valve device of Comparative Example 1. In addition, there was little change in the leakage amount due to changes in cooling water temperature or changes in differential pressure.

INDUSTRIAL APPLICABILITY

According to one aspect of the present invention, it is possible to provide a valve device that enables appropriate cooling control with a compact drive unit in which a decrease in sealing performance due to a temperature change is suppressed.

REFERENCE SIGNS LIST

8: Valve device
21: Casing
22: Rotor (valve)
41: Radiator port (outflow port)
41b: Radiator outlet (outlet)
42: Radiator joint (joint)
56: Warming port (outflow port)
56a: Warming outlet (outlet)
62: Warming joint (joint)
66: Air conditioning port (outflow port)
66a: Air conditioning outlet (outlet)
68: Air conditioning joint (joint)
95: Radiator communication port (communication port)
96: Warming communication port (communication port)
97: Air conditioning communication port (communication port)
101: Sealing tube portion (sealing wall, first restriction portion)
126: Second burr accommodating portion (burr accommodating portion)
131: Sliding ring
132: Biasing member
133: Sealing ring
134: Holder
141: Large diameter portion
141a: Sliding surface
142: Small diameter portion
143: Stepped surface (facing surface)
151: Holder tube portion
152: Holder flange portion
153: Restriction portion (second restriction portion)

The invention claimed is:

1. An engine cooling system valve device comprising:
   a casing having an outflow port in which a fluid outlet opening in a first direction is formed;
   a joint joined to an opening end surface of said outlet in said outflow port;
   a valve accommodated in said casing so as to be rotatable or slidable and in which a communication port that can communicate with said outlet is formed;
   a sliding ring that has a sliding surface for sliding on an outer surface of said valve while being accommodated in said outflow port and communicates said outlet and said communication port in accordance with a rotating position or a sliding position of said valve; and
   a sealing ring interposed between an inner peripheral surface of said outflow port and an outer surface of said sliding ring,
   wherein at least said outer surface of said valve comprises a first resin material that contains a first resin as a main component, at least said sliding surface of said sliding ring comprises a second resin material that contains a second resin as a main component, said first resin and said second resin are both polyphenylene sulfide, polyether ether ketone or polyamide, said sliding ring comprises:
- a small diameter portion having said outer surface on which said sealing ring slides; and
- a large diameter portion which is positioned on a side of said valve in said first direction with respect to said small diameter portion and is increased in diameter with respect to said small diameter portion, a surface of said large diameter portion facing said valve in said first direction constitutes said sliding surface, a surface of said large diameter portion facing an opposite side of said valve in said first direction constitutes a facing surface that faces said sealing ring in said first direction, and an area of said sliding surface is larger than an area of said facing surface.

2. The engine cooling system valve device according to claim 1, wherein a sliding speed of said sliding surface with respect to said outer surface when said valve rotates or slides is 3 m/min or less.

3. The engine cooling system valve device according to claim 2, wherein a surface pressure acting between said outer surface and said sliding surface when said valve rotates or slides is 1 MPa or less.

4. The engine cooling system valve device according to claim 3, wherein a linear expansion coefficient of said second resin material is from 40 to 250% with respect to a linear expansion coefficient of said first resin material.

5. The engine cooling system valve device according to claim 3, wherein said first resin and said second resin are both polyphenylene sulfide.

6. The engine cooling system valve device according to claim 2, wherein a linear expansion coefficient of said second resin material is from 40 to 250% with respect to a linear expansion coefficient of said first resin material.

7. The engine cooling system valve device according to claim 2, wherein said first resin and said second resin are both polyphenylene sulfide.

8. The engine cooling system valve device according to claim 1, wherein a linear expansion coefficient of said second resin material is from 40 to 250% with respect to a linear expansion coefficient of said first resin material.

9. The engine cooling system valve device according to claim 8, wherein said first resin and said second resin are both polyphenylene sulfide.

10. The engine cooling system valve device according to claim 1, wherein said first resin and said second resin are both polyphenylene sulfide.

* * * * *